May 30, 1944.  M. G. MILLER  2,349,978
SPLIT HOUSING PLUG VALVE
Filed Oct. 2, 1942  2 Sheets-Sheet 1
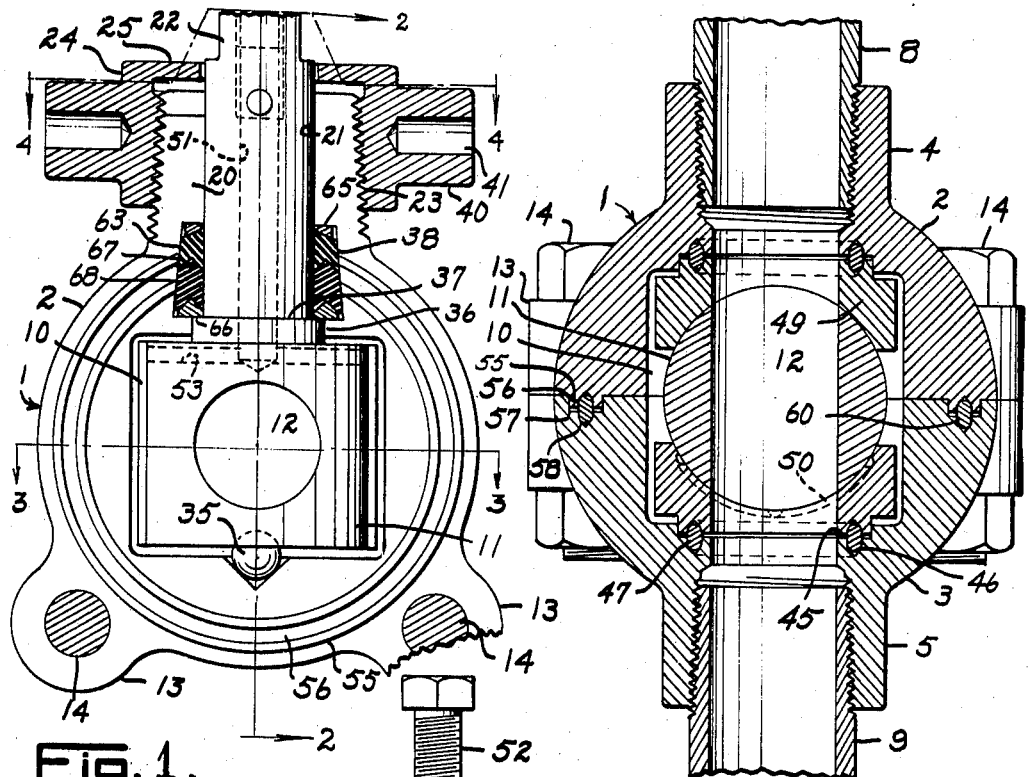
Fig. 1.
Fig. 3.
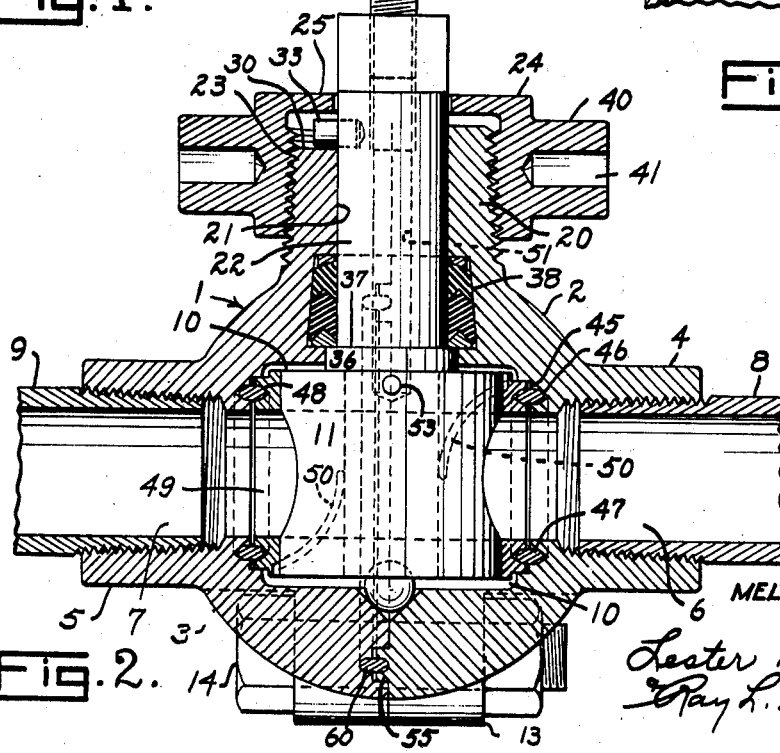
Fig. 2.
MELVIN G. MILLER
INVENTOR.
Lester B. Clark
Ray L. Smith
ATTORNEYS May 30, 1944. M. G. MILLER 2,349,978

SPLIT HOUSING PLUG VALVE

Filed Oct. 2, 1942 2 Sheets-Sheet 2

MELVIN G. MILLER
INVENTOR.

BY Lester B. Clark
Ray L. Smith

ATTORNEYS

Patented May 30, 1944

2,349,978

UNITED STATES PATENT OFFICE 2,349,978

SPLIT HOUSING PLUG VALVE

Melvin G. Miller, Houston, Tex., assignor of one-fourth to Thomas N. Hunt

Application October 2, 1942, Serial No. 460,472

1 Claim. (Cl. 251—156)

This invention relates to improvements in valves, and more particularly to a valve comprising a split housing and means for relatively moving the portions of the housing to and from each other so that the movable valve member may be fixed in open or closed position but may be released for movement to and from such positions.

The primary object of the invention is to provide a valve which is simple and inexpensive to construct and maintain and which is reliable in operation for a long period of time.

Another object is to provide a valve that is impervious to leakage and yet one which may be readily moved to and from open and closed positions.

Another object is to provide a valve in which the valve member is fixed between its seats when such member has been moved to a desired position.

A further object is to provide a valve in which release of the valve member for movement may be readily effected when movement thereof is desired.

Still another object is to provide a valve including a split housing made up of sections having a valve chamber therein, one end of the sections being normally connected together while the other ends thereof are releasably secured so that the valve member may be clamped against movement or relieved for movement as desired.

Another and more specific object is to provide a valve having complemental housing sections with outwardly extending boss sections to receive the valve stem, a release nut being threadedly mounted upon tapered threads on the boss formed by the sections.

Another object of the invention is to provide a valve member to be clamped or released by the sections of a split type of valve housing.

Still another object is to provide a valve having housing sections that may be clamped upon a valve member therein, means being provided for effecting an adequate seal against high pressures either when the valve is clamped in desired position or released for movement of the valve member.

A still further object is to provide a valve which is so constructed as to minimize corrosion of the sealing surfaces and includes means for facilitating movement of the valve member after such member has been in one position for a long period of time.

The foregoing objects, together with other objects and advantages of the invention will be apparent from the following description taken in connection with the accompanying drawings in which:

Fig. 1 is a transverse sectional view through a valve embodying the invention, one section of the housing having been removed for purposes of the view;

Fig. 2 is a sectional view through the valve taken on line 2—2 in Fig. 1;

Fig. 3 is a horizontal view through the valve on line 3—3 in Fig. 1;

Figure 4:
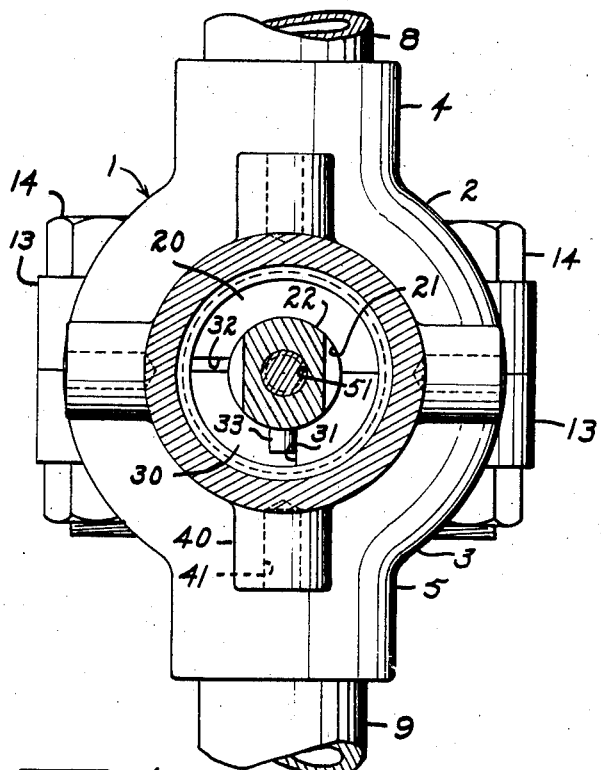
Fig. 4 is a sectional view taken on line 4—4 in Fig. 1.

In the drawings the valve housing or body is shown generally at 1 and comprises a plurality of sections shown as two in number identified as 2 and 3. These sections have thickened wall portions 4 and 5, respectively, having passages 6 and 7 therein, such passages being threaded internally for connection with pipe ends 8 and 9 whereby the valve may be secured in a pipe line for operation for its intended purpose. It is to be understood that, if desired, a flange or other suitable connection may be provided between the housing 1 and the pipe sections 8 and 9.

The passages 6 and 7 terminate at their inner ends in enlargements which form the chamber 10 within which the valve member 11 is positioned. This member has a through passage 12 to provide for the passage of fluid through the valve when the parts thereof are in the relative positions shown in Figs. 1, 2 and 3.

At one side of a plane passing through the axis of the valve housing 1 and the valve member 11 the sections 2 and 3 are provided with ears 13 having openings to receive clamping bolts 14 which secure the sections 2 and 3 together after valve member 11 has been positioned within the chamber 10. At the opposite side of such plane the sections 2 and 3 are provided with semi-cylindrical projections 20 which provide a passage 21 to receive the valve stem 22 of the valve 11. The boss formed by the projections 20 is provided with tapered threads 23 on its exterior surface and these threads are engaged by complementary threads on the interior of a clamping nut 24 which is flanged inwardly at 25 to overlie the ends of the projections 20 about the stem 22. Outwardly of the clamping nut 24 the stem 22 is provided with flattened surfaces, or a suitable equivalent, so that the stem may be engaged by a tool to effect desired movement of the valve member 11.

As best seen in Fig. 4, one of the projections 20 has its end cut away at 30 to provide shoulders 31 and 32 engageable by a pin 33 secured in the side of the stem 22 so that rotation of the valve stem is limited to movements between fully opened and fully closed positions. It is to be noted that this mechanism for controlling the movement of the valve is entirely enclosed within the clamping nut 24.

The limit of downward movement of the valve member 11 is determined by a ball 35 engaged within opposed recesses in the housing 1 and the valve member 11. The valve 11 is restrained against upward movement by virtue of an enlargment 36 on the stem 22, such enlargement providing an upwardly facing shoulder 37 adapted to engage the packing assembly 38 to which further reference will be made.

The clamping nut 24 may be of any suitable configuration for engagement with an operating tool, but I prefer that such nut shall be provided with lugs 40 having holes 41 therein to receive a rod-like tool. Such form of tool is extremely simple and may be conveniently stored or carried.

Figure 5:
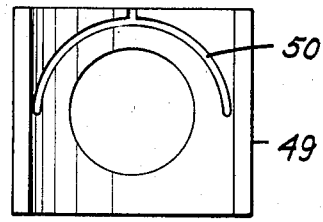
Fig. 5 is an elevational view of one of the valve seat inserts.

Surrounding each of the passages entering the chamber 10 is a shoulder 45 having an annular groove 46 to receive a seal ring 47 which enters a similar groove 48 in the outer axial face of the seat ring 49. The inner face of the seat ring 49 is contoured to fit the surface of the valve member 11 and has an arcuate groove 50 (Fig. 5) therein to receive a lubricant introduced through the passage 51 within the valve stem 22. This lubricant is introduced under pressure in any suitable manner as, for example, by means of a screw 52 threadably fitting within the bore 51 at the upper end of the stem 22.

The passage or bore 51 terminates at its lower end in a transverse opening 53 in the valve member so that the lubricant is introduced under pressure to the interior of the chamber 10 and thence to the arcuate grooves 50 within the seat rings 49.

It may be noted that the pressure exerted upon the packing 48 interposed between the respective sections 2 and 3 and the seat rings 49 is effected by clamping action between the seat rings and the valve member 11. Attention is also directed to the fact that, as best seen in Fig. 2, the left-hand seat member is so positioned that the groove 50 therein opens at the bottom of the chamber 10, such arrangement facilitating complete lubrication of the valve surfaces.

Section 2 of the housing 1 has an annular axially extending tongue 55 which is grooved at 56, as best seen in Figs. 1 and 3, and this tongue is adapted to enter a complementary groove 57 in the sections 3. The groove 57 has an inner groove 58 opposite the groove 56 in the tongue 55 and a packing or seal ring 60 is positioned within these complemental grooves to provide an efficient seal between the housing sections 2 and 3.

The tongue 55 in the section 2 and the groove 57 in the section 3 are interrupted proximate the projections 20 by semi-circular recesses 63 which form an annular groove about the valve stem 22. The packing assembly 38 is positioned within this groove to form a seal with the valve stem 22 and also to engage the ends of the packing 60 interposed between the sections 2 and 3. This packing assembly comprises upper and lower metallic rings 65 and 66 (Fig. 1) and intervening packing rings 67 and 68, this structure being found well adapted to maintain the desired seal at all times during the use of the valve.

Figure 6:
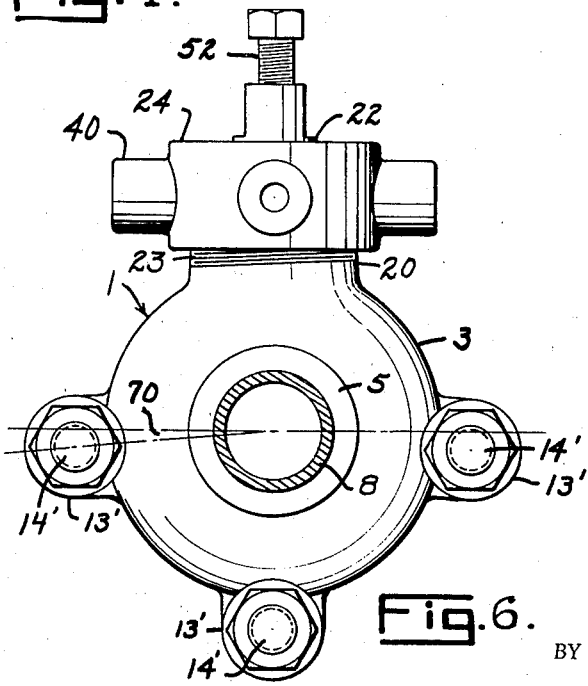
Fig. 6 is an elevational view of a modified form of the invention.

Fig. 6 shows a structure which is similar to that above described, but in this modification the housing sections 2 and 3 are provided with three ears 13' through which bolts 14' pass to clamp the lower portion of the housing sections together. This modification is desirable particularly where fluids under extremely high pressure are to be controlled by the valve. It is to be noted that all of the ears 13' are below a horizontal plane through the axis of the valve, the center line of the uppermost clamping bolts being displaced below such plane by an angle indicated at 70.

Figure 7:
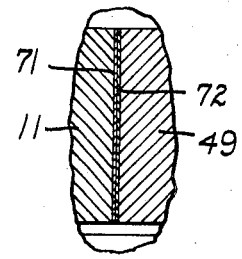
Fig. 7 is a detail showing the utilization of a layer of sealing material upon the sealing surfaces within the valve.

Fig. 7 is a detail showing a modification in which thin coatings 71 and 72 are applied to the valve member 11 and the seat rings 49. The use of such a coating having a desired degree of hardness facilitates accurate seating engagement and also may be of such nature as to resist any tendency for corrosion to take place upon these surfaces. Under such circumstances the use of a lubricant is not imperative and hence the lubricating structures above described may be omitted without departing from the invention.

The general advantage of the structure just described resides in the feature of clamping and releasing the valve member relative to the housing. When the two bolts 14 are inserted, the two parts of the housing are clamped together and confine the plug member between them. The upper ends of the parts, including the neck portions 20, will stand apart slightly until such time as the nut 24 is secured down on the neck portions to draw them together. As the upper ends of the two parts are drawn together by this turning action of the nut, the plug will be firmly clamped between the two parts of the valve and the seating portions 49 which are carried by the housing parts.

It seems obvious that release of the nut will tend to release the plug member for turning action, and after the plug has been turned it is only necessary to tighten up the nut in order to lock and clamp the plug member against any further movement. This arrangement provides for the locking of the plug member in any desired position.

Attention is directed to the fact that the three points of connection are substantially symmetrically arranged in the Fig. 1 form of the invention, so that it might be said that the two bolts 14 act as fulcrums for the housing parts when the nut 24 is used to draw the two portions together. Of course, the clamping bolts 14 may be adjusted if desired, but it has been found that once the clamping bolts are properly adjusted it is only necessary to operate the nut 24 in either releasing or locking the valve member in the desired position. Sufficient movement is permitted between the two valve parts upon release of the nut to break the seal or contact of the plug member with the seats and facilitate its turning.

When the valve is to be assembled the packing 48 and one of the seat rings 49 are positioned within one of the housing sections. The valve member 11 is then positioned in the portion of the chamber 10 within such section, packing assembly 64 having been placed around the stem 22 so that such assembly fits within the recess 63 in such section. The ball 45 is placed within the complementary recesses in the section and the valve member 11 and packing 60 is placed within the annular groove 56 so that the ends thereof are in abutment with the periphery of the packing assembly 64.

In a similar manner packing 48 and the other valve seat member 49 are positioned within the other housing sections which is placed upon the previously assembled parts and in a manner that the openings in the ears 13 are in alignment. Bolts 14 are then passed through the ears 13 and are tightened sufficiently to effect a seal between the housing sections 2 and 3.

Dimensions of parts are such that tightening of the bolts 14 does not rigidly clamp the valve member 11 but instead, applies only a relatively light pressure thereto. Clamp nut 24 is then threaded upon the boss formed by the projections 20 and is advanced an insufficient distance to effect rigid clamping of the valve member. A tool may then be applied to the upper end of the valve stem 22 to move the valve member to the desired open, closed, or intermediate position. When such position is reached the clamping nut 24 may be advanced by means of a suitable rod inserted within an opening 41 whereupon the valve member 11 is clamped in position.

If the position of the valve member 11 is to be altered, desired movement can be effected by first loosening the clamping nut 24 whereby the pressure upon the valve member is reduced. At the same time, relative movement of parts will break any corrosion which may have taken place between the valve member 11 and the head members in engagement therewith. Hence, the valve member 11 may be readily removed to a new position whereupon the clamping nut 24 is again rotated to effect desired clamping of the valve member.

Broadly, the invention comprehends a valve comprising a split housing which is so constructed and arranged that portions of the housing may be relatively moved to clamp or release the valve member therebetween.

What is claimed is:

A valve including a housing comprising sections forming an enclosed chamber having ports leading thereto from opposite sides, complemental projections on said sections forming a passage transversely of the axis of said ports from within said chamber, a valve member within the chamber, a stem on said member extending through said passage, means opposite said projections securing the sections together, tapered threads on the periphery of the projections and a clamping member having complemental threads engaging said tapered threads whereby the sections may be clamped rigidly upon the valve member and released therefrom when the position of the valve member is to be changed.

MELVIN G. MILLER.